(No Model.)
J. M. LINDSLY.
NUT LOCK.
No. 321,735. Patented July 7, 1885.
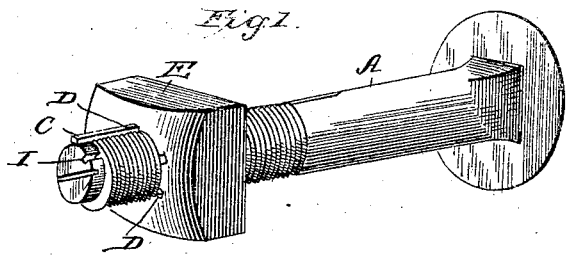
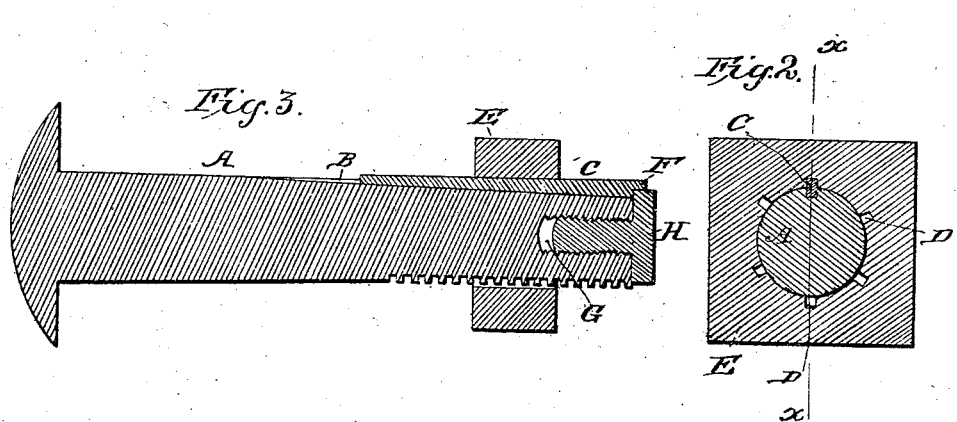
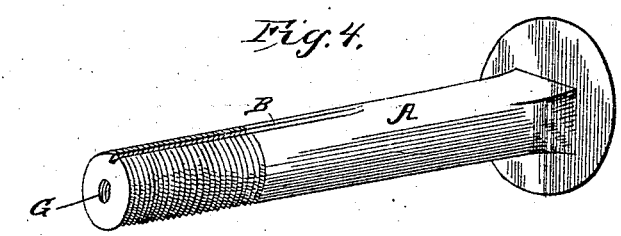
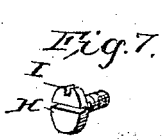
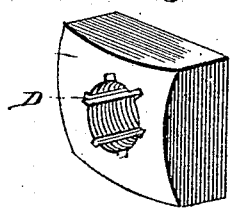
WITNESSES:
Fred. G. Dieterich.
Wm. Pecher
James M. Lindsly
INVENTOR.
By Louis Bagger & Co.,
ATTORNEYS.

UNITED STATES PATENT OFFICE.

JAMES MELVERN LINDSLY, OF GROVE CITY, ILLINOIS.

NUT-LOCK.

SPECIFICATION forming part of Letters Patent No. 321,735, dated July 7, 1885.

Application filed February 16, 1885. (No model.)

*To all whom it may concern:*

Be it known that I, JAMES M. LINDSLY, a citizen of the United States, and a resident of Grove City, in the county of Christian and State of Illinois, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a bolt and nut provided with my improved nut-lock. Fig. 2 is a cross-section through the nut. Fig. 3 is a longitudinal section on line $x\ x$, Fig. 2, and Figs. 4, 5, 6, and 7 are perspective detail views of the component parts of the lock.

Similar letters of reference indicate corresponding parts in all the figures.

My invention has relation to that class of nut-locks in which the nut is retained in place upon the bolt by means of a key inserted into a groove in the bolt and in a corresponding groove in the nut; and it consists in the improved construction and combination of parts of the same, as hereinafter more fully described and claimed.

In the accompanying drawings, the letter A indicates the bolt, the threaded part of which has a longitudinal groove, B, into which fits a key, C, having a portion projecting outside of the thread of the bolt, and fitting into one of a number of longitudinal grooves, D, in the inside thread of the nut E. The upper end of the key has a notch forming an offset or shoulder, F, and the bolt has a threaded recess, G, into which fits the threaded shank of a screw, H, having a notch, I, in the edge of its head, registering with the longitudinal groove in the bolt, the edge of the head of the screw fitting in the notch in the end of the key, the under side of the head bearing against the shoulder.

The screw may be dispensed with, and in place of the same a pivoted plate secured upon the end of the bolt, which plate has a notch similar to the notch in the screw-head; but I prefer to use a screw, as the same will be capable of being screwed down upon the end of the key, and hold the same more securely than a pivoted plate.

It will be seen that when the lock is to be put in practice the nut is screwed home upon the bolt until one of the grooves in the thread of the nut will register with the longitudinal groove in the thread of the bolt when the key is placed in the two grooves, preventing the nut from turning upon the bolt, whereupon the screw is turned so as to bring the notch in its periphery away from registering with the longitudinal groove in the bolt, the notch and groove registering when the key is inserted.

For the purpose of removing the nut the reverse operation is performed, and it will be seen that the screw will effectually prevent the key from slipping out of the grooves, where it prevents the nut from turning.

Having thus described my invention, I claim and desire to secure by Letters Patent of the United States—

1. In a nut-lock, the combination of a bolt having a longitudinal groove in its threaded portion, a nut having longitudinal grooves in its thread, a key fitting in the groove of the bolt and into a registering-groove in the nut, and a retaining-head having a notch in its edge corresponding to the groove in the bolt, and turning upon the end of the bolt, as and for the purpose shown and set forth.

2. The combination, in a nut-lock, of a bolt having a longitudinal groove in its thread and having a female threaded recess in its end, a nut having a number of longitudinal grooves in its thread, a key fitting into the groove of the bolt and into one of the grooves of the nut, and having a shoulder at its upper end, and a screw having its shank fitting into the recess in the end of the bolt, having its head fitting against the shoulder of the key, and having a notch in the end of its head corresponding to the groove in the bolt, as and for the purpose shown and set forth.

In testimony that I claim the foregoing as my own I have hereunto affixed my signature in presence of two witnesses.

JAMES MELVERN LINDSLY.

Witnesses:
H. C. SHANAFELT,
M. U. HOUGLAND.